March 30, 1965  F. R. McMURRAY  3,175,851
BELL JOINT PIPE CLAMP WITH ROCKABLE DRAWBOLTS
Filed June 27, 1962  2 Sheets-Sheet 1

INVENTOR.
FREDERICK R. McMURRAY.
BY
Eugene C. Knoblock
ATTORNEY.

March 30, 1965 F. R. McMURRAY 3,175,851
BELL JOINT PIPE CLAMP WITH ROCKABLE DRAWBOLTS
Filed June 27, 1962 2 Sheets-Sheet 2

INVENTOR.
FREDERICK R. McMURRAY.
BY
Eugene O. Knoblock
ATTORNEY.

United States Patent Office 3,175,851
Patented Mar. 30, 1965

3,175,851
BELL JOINT PIPE CLAMP WITH ROCKABLE
DRAWBOLTS
Frederick R. McMurray, South Bend, Ind., assignor to
M. B. Skinner Company, a division of Textron Oregon,
Inc., South Bend, Ind., a corporation of Delaware
Filed June 27, 1962, Ser. No. 205,753
3 Claims. (Cl. 285—337)

This invention relates to bell joint pipe clamps, and more particularly to a pipe repair clamp to prevent leaks at the joints of pipes at bell and spigot connections of adjoining pipe sections.

Inasmuch as clamps of this character are employed to repair pipe leaks in pipe lines such as those containing liquids and those containing gases and located frequently under ground, the problem of providing adequate space for the proper application of a pipe clamp and the tightening thereof is important. Thus, if a clamp is to be applied to a pipe located below ground level, it is necessary to dig a trench to expose the leaking portion of the pipe, and it is desirable from the standpoint of economy of labor and economy of time to make a trench of the smallest size which will permit the installation of the pipe clamp. Also, it is desirable for convenience and speed of operation to pre-assemble parts of the clamp above ground, thus minimizing the number of operations which need to be performed at the work site. Reduction of the size of the parts of the clamp is also desirable from the standpoint of the cost of the clamp and from the standpoint of control of the direction at which tension is applied to tension members for tightening a sealing gasket.

Heretofore clamps of this character have utilized anchor rings engaging the bell portion of a pipe joint and projecting radially therefrom a substantial distance in order to provide means for anchorage of a drawbolt thereat, which drawbolt extends to a follower ring which engages a gasket and draws that gasket firmly into sealing engagement at a leaking bell and spigot joint. The size of the parts has frequently been such that it is necessary for the drawbolts to extend at an angle to the axis of the pipe so that the direction of pull of the bolts is at an angle to the direction at which the follower ring is urged for gasket tightening purposes.

This relation of parts, or the diameter of a follower ring required to avoid angular positions of the drawbolts, has introduced problems of reinforcing and strengthening either or both of the anchor and follower rings, particularly where the rings are made in multiple sections which are connected together at the point of use, inasmuch as the major cross-sectional dimension of each ring extends perpendicularly to the direction in which bolt stress is applied thereto. Hence the design of clamp rings of sufficient strength for the intended purpose has required parts of substantial size, weight and cost, and the size of ring has determined the size of the trench required for the assembly of the device.

It is the primary object of this invention to provide a novel bell joint pipe clamp of smaller size and less weight than prior bell joint clamps, which is easy to apply and which is of less cost than prior clamps.

A further object is to provide a bell joint pipe clamp with an anchor ring of small outer diameter which permits application of clamps to pipes located in close quarters in a trench or close to adjoining pipes or obstructions.

A further object is to provide a bell joint clamp of this character of small diameter wherein the drawbolts utilized to interconnect the anchor ring and follower ring are positioned parallel to the axis of the pipe, and may be preassembled with one of said rings at a remote location and easily joined to the opposite ring at the point of use.

A further object is to provide a bell joint pipe clamp wherein an anchor ring, a follower ring and bolts may all be formed of similar material so that no problem of electrolytic corrosion due to differences in metals in the presence of soil is encountered, or wherein the ring parts may be covered with a protective coating easily and inexpensively.

A further object is to provide a bell joint clamp of this character which utilizes hook bolts to interconnect an anchor ring and a follower ring and to accommodate easy assembly of the parts in a manner to eliminate tendency of tilting or deforming of either ring.

A further object is to provide a bell joint pipe clamp of this character having an anchor ring connected to a follower ring by hook bolts, wherein the anchor ring has a reinforcing part at which the hook bolts anchor, and wherein the major cross-sectional dimension of the anchor ring is substantially parallel to the pipe.

Other objects will be apparent from the following specification.

Figure 1:
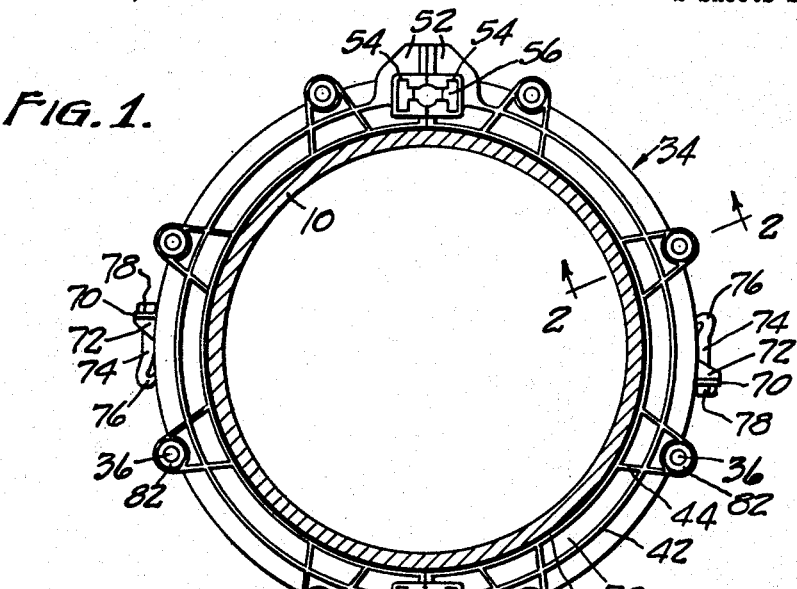
FIG. 1 is a transverse sectional view of a pipe taken on line 1—1 of FIG. 2 and illustrating a bell joint pipe clamp as viewed from the follower ring end thereof.

In the drawings the numeral 10 designates sections of a pipe, each of which has a spigot end at which a circumferential bead 12 is usually provided and a bell end 14 characterized by an enlarged inner bore 16 of a diameter greater than the diameter of the bead 12 so as to receive the beaded end. The bell end bore may be circumferentially grooved at 18 and the bell is preferably provided with a substantially cylindrical end portion between its end face and a circumferential end shoulder 20. The adjacent pipe sections are arranged in interfitting relation and packing material 22 in annular form is introduced in the bore 16 around the pipe 10 and bears against the bead 12, as shown. An annulus of lead or other retaining material 24 encircles the pipe 10 within the bore 16 and engages the annular groove 18. Leakage at such joints between pipe sections occurs from time to time in water lines, gas lines, oil pipe lines and the like, necessitating the application of an annular sealing gasket pressed against the leaking area of the joint to stop the leakage.

Figure 2:
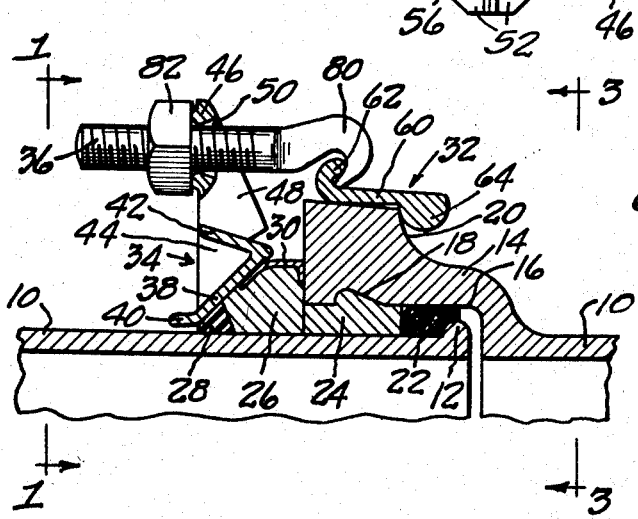
FIG. 2 is an enlarged fragmentary detail sectional view taken on line 2—2 of FIG. 1.
Figure 5:
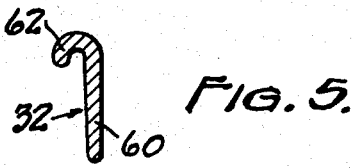
FIG. 5 is an enlarged sectional view taken on line 5—5 of FIG. 4.

Bell joint pipe repair clamps utilize an annular rubber or synthetic rubber gasket 26 preferably of substantially triangular cross-section encircling the pipe 10 snugly and of a thickness to extend across the end of the lead ring 24 and against the end surface of the bell 14 of the cooperating pipe section. The gasket usually includes a part 28 which is formed of different material than the gasket body and usually of a different hardness than the remainder of the gasket. Thus the body of the gasket may be comparatively soft and the part 28 thereof may be of a harder rubber which will resist extrusion. A thin metal band 30 preferably encircles the major portion of the gasket ring 26 to confine the same when subjected to compression for sealing purposes. A band construction as best seen in FIG. 2 is preferred, being characterized by a marginal flange on the band extending in face engagement with the end of the bell 14 and a part-conical opposed marginal flange following the contour of a beveled face of the gasket.

The means for compressing the gasket 26 and maintaining it in leak-sealing relation at a bell and spigot joint conventionally comprises an anchor ring 32 which encircles and has mechanical anchorage with the bell end 14 of one pipe section, and a follower ring 34 which encircles the spigot portion of the adjacent pipe section and has a gasket engaging face. The two rings 32 and 34 are interconnected by drawbolts 36.

The follower ring 34 here shown is of sectional construction and preferably is of V-shape in cross-section. Thus the ring may be characterized by a frusto conical gasket-engaging part 38 terminating at its inner diameter at a substantially cylindrical reinforcing flange 40 of a diameter to have slight clearance with the pipe 10. The V-shaped cross-section is completed by a second slightly tapered frusto conical wall portion 42 extending outwardly of the part 38. Radial reinforcing flanges 44 interconnect the walls 38 and 42 at spaced intervals preferably adjacent to radially projecting ear portions 46 which are carried and suitably reinforced by flanges 48 and which have bolt-receiving openings 50 therein spaced radially from the gasket-engaging inner part 38, 42 of the ring.

The follower ring sections may be provided with any suitable means for interconnecting the same to define a single continuous ring and, as here shown, such interconnection may be provided by a construction of the character shown in Patent No. 2,115,670 to P. D. Merrill, dated April 26, 1938. This interconnection comprises the formation of enlargements 52 at the ends of the ring sections which are provided with abutting end faces interrupted by tapered matching sockets or keyways 54 cooperating to receive opposite sides of a configured tapered locking member or key 56 provided with a screw-threaded end (not shown) upon which a nut (not shown) may be threaded so as to move the lock member in the sockets in a manner to draw the end faces of the ring sections into firm abutment to define a continuous strong and rigid gasket compressing ring structure.

Figure 4:
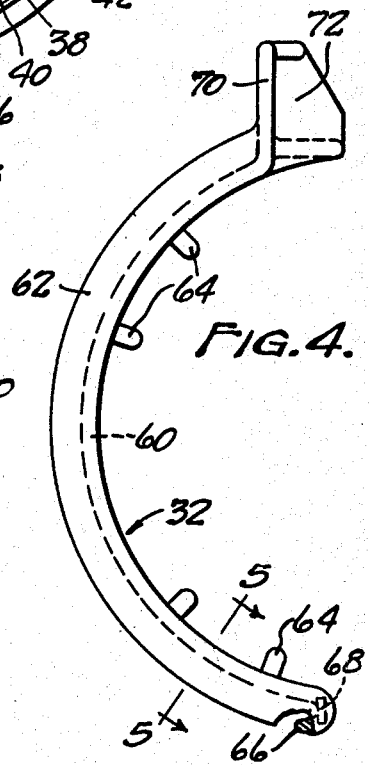
FIG. 4 is a plan view of a section of an anchor ring.

The anchor ring 32 is formed in a plurality of sections, each of which constitutes a body portion 60 of part-circular or part-cylindrical form having an inner diameter slightly larger than the outer diameter of the bell portion of the pipe at the shoulder 20 thereof, so that said interconnected body parts 60 will constitute a substantially flat or cylindrical ring encircling the large diameter portion or lip of the bell with its major longitudinal cross-section substantially parallel to the axis of the ring. At one margin thereof, the ring body 60 has integrally formed therewith an outturned return bent circumferential flange 62 of hook shape in cross-section extending substantially full length thereof. At spaced intervals along the circumferential length of the body 60 at the margin thereof opposite that from which the flange 62 projects are located a plurality of spaced radially projecting anchoring or abutment members or enlargements 64 projecting inwardly relative to the inner diameter of the body 60, as best seen in FIGS. 2 and 4. These abutments 64 are of such size as to engage the shoulder 20 of the bell end of the pipe when the anchor ring operatively encircles that bell and as illustrated in FIG. 2. The number of abutments 64 and their spacing and arrangement is preferably correlated to the number, spacing and arrangement of the radially projecting ears 46 of the follower ring so that at least some of the anchor projections 64 may be located adjacent to or in longitudinal alignment with the drawbolts 36, as seen in FIG. 3.

Figure 6:
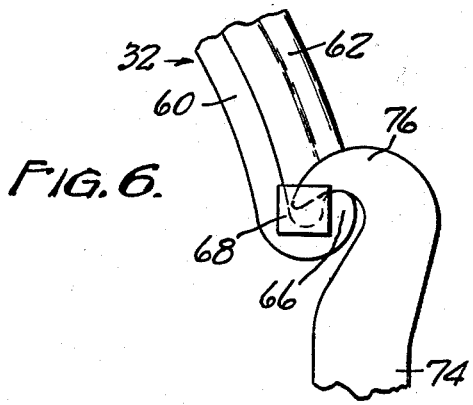
FIG. 6 is an enlarged fragmentary end view illustrating the manner in which anchor ring sections are interconnected by means of hooks.
Figure 7:
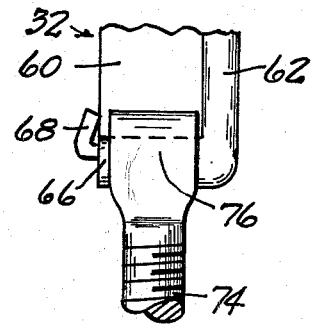
FIG. 7 is a side view illustrating the parts shown in FIG. 6, as seen from the right in FIG. 6.

Each section of the anchoring ring 32 preferably terminates at one end thereof in a hook portion 66 formed integrally with the body 60 and the hook flange 62, and a tongue 68 is preferably formed at said end at the side opposite the hook flange 62 to close the open end of the hook socket, as best seen in FIGS. 6 and 7. The opposite end of each section of the anchor ring 32 is preferably characterized by an outturned wall or flange portion 70 apertured to receive the shank of a bolt 74 clear of the body portion 60 and the hook flange 62 of the anchor ring. Suitable reinforcing flanges 72 project beyond the outturned wall 70 at the end of each anchor ring section to rigidify and position the wall 70 upon the application of stress thereto tending to bend or deform the wall 70 from its normal outwardly projecting position illustrated in FIG. 4.

Hook bolts 74 each have a shank portion thereof passing through an aperture in an end wall 70 of one ring section and a hook end 76 formed at one end of the bolt and engageable with the end hook part 66 of the adjacent ring section. A nut 78 is threaded on the shank of each bolt and engages the wall 70 and serves to draw on the bolt to pull together the adjacent ends of adjacent ring sections to insure abutment of the assembled anchor ring with the bell end portion of the pipe which it encircles, as seen in FIG. 2. This maintains the anchor ring portions in operative relation to the bell of the pipe without necessarily rigidly predetermining the relative positions of the ring sections. Instead of rigid predetermined orientation of the ring sections, the use of the hook bolts between the ring sections permits the individual ring sections to seat themselves upon the bell end portion of the pipe, as seen in FIG. 2, in such a position and manner that each section will be normal to said pipe bell portion which it engages, and each of the abutments or enlargements 64 will seat against the shoulder surface 20 of the adjacent bell of the pipe.

Figure 3:
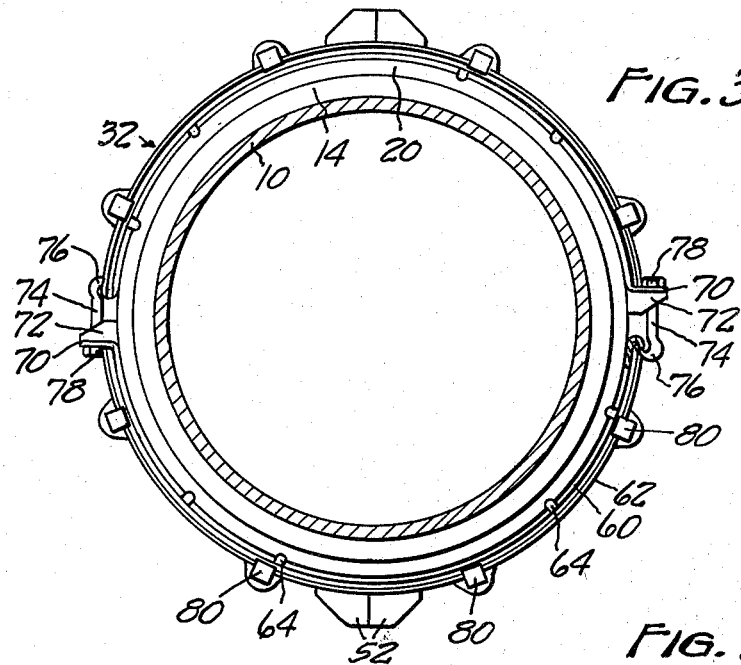
FIG. 3 is a sectional view taken on line 3—3 of FIG. 2 and illustrating a pipe repair clamp at the anchor ring end thereof.

Each of the drawbolts 36 is characterized by an elongated screw-threaded shank and a hook portion 80 at one end thereof engageable with the hook flange 62 of the anchor ring, as illustrated in FIGS. 2 and 3. Each drawbolt 36 extends through and is rockable in an aperture 50 in a radially projecting ear 46 of the follower ring, and each has a nut 82 threaded thereon, as seen in FIG. 2.

While the device has been illustrated herein as entailing the use of anchor rings and follower rings, each formed of two substantially semicircular sections, it will be understood that this is illustrative and is not intended to be limiting. The number of ring sections of each of these rings may be determined according to the diameter of the pipe upon which the clamp is to be used. Thus each of the rings may be formed of three or more sections, if desired. Similarly, it will be understod that the means for connecting the various sections of the various rings are illustrative and not intended to be limiting. Thus any of the constructions for connection of ring sections heretofore known in the art may be employed. I do find, however, that the use of the construction of the anchor ring with the hook bolt connection of the sections is advantageous and therefore is desirable in at least some installations.

In the assembly of the parts of the clamp, the various sections of the follower ring initially have the drawbolts 36 with their nuts 82 thereon assembled as units prior to application of the pipe. This is not required but has been found to be advantageous in operation. The sections of the follower ring are then assembled or connected to form the complete follower ring, and this can be done at any point along the length of the pipe which is convenient and may be done at a point remote from the leaking joint. Since the inner diameter of the flange portion 40 of the follower ring is larger than the outer diameter of the pipe 10, the assembled ring may easily be slid lengthwise upon the pipe after the sections of the follower ring have been operatively connected together to form a rigid unit, and this can easily be done despite the fact that the various drawbolts 36 are operatively connected to the follower ring assembly or unit.

The sections of the anchor ring 32 may then be assembled around the pipe at the pipe bell by the use of the hook bolts 74 which previously preferably have been assembled with a ring section by passing through an aperture in an end wall 70 thereof and then having the nut 78 applied. Thus it will be apparent that assembly of the anchor ring 32 is accomplished quickly by bringing the various sections thereof into proper relation to the pipe bell, connecting the bolt hooks 76 with the hook ends 66 of adjacent ring end sections and then tightening the nuts 78.

Thereupon, a strip of gasket material 26 is applied around the pipe 10 adjacent the bell joint at which the leak exists, and is positioned against the bell end, as shown in FIG. 2, and the metal reinforcing band 30 is then applied around the gasket. Thereupon the follower ring 34 is moved bodily to a position in engagement with the gasket 26 and band 30 and the drawbolts 36 are so manipulated that hooks 80 on the ends of the drawbolt 36 are engaged with the hook flanges 62 of the anchor ring 32. Thereupon, by rotating the nuts 82 to advance the drawbolts 36, pressure is exerted upon the gasket 26 by the follower ring in an axial direction to compress the gasket axially and squeeze it radially inwardly against the pipe to effect a seal at the leaking pipe joint area adjacent the lead ring 24.

It will be apparent that, by reason of the generally cylindrical form of the body 60 of the anchor ring and the connection of the drawbolts 74 with the hook flanges 66 lengthwise or circumferentially of each section of the anchor ring, the profile of the clamp assembly at the anchor ring is small. Thus it is possible to use my new clamp in cases where the bell joints of a pipe line are closely adjacent to structural walls, adjacent pipes, or the like, or where narrow trenches are dug to expose subterranean pipe installations. Because of such small diameter of the anchor ring 32 through the major portion thereof, increased clearance need be provided only at the ends of the anchor ring sections to accommodate the parts 70, 72 thereof. This small size of the anchor ring reduces the weight and cost of the ring and thus is a distinct economic advantage. Note in this connection also that costs are held at a minimum because it is not necessary to provide an anchor ring construction with apertures at which drawbolts are received, and, further, because only one bolt hole is required to receive the ring-section-connecting bolts 74 at each of the connections between anchor ring sections. This economical and small size of the anchor ring does not sacrifice strength, however, and it will be seen that the major cross-sectional dimension of the anchor ring extends lengthwise of the pipe and substantially parallel to the direction in which the drawbolts 36 apply stress to the anchor ring incident to tightening thereof for the purpose of advancing the follower ring to compress the gasket 26.

Another important consideration of the construction is that the use of hook bolts for connecting the sections of the anchor ring places the bolt 74 close to the pipe bell so as to eliminate tendency of the stresses acting upon the anchor ring to tip the parts of the anchor ring or to deform the ends of the anchor ring incident to connection of the sections. The use of hook bolts 36 in the clamp as drawbolts between anchor and follower rings is important because the rings may be so proportioned as to locate the drawbolts 36 substantially parallel to the axis of the pipe 10. Consequently, when the nuts 82 are rotated to advance the drawbolts 36, the pull exerted lengthwise of the bolt is in a direction parallel to the axis of the pipe and substantially parallel to the axis of the follower ring 34 so that effective anchorage of the anchor ring 32 is maintained. Tendency of the drawbolts to tilt the anchor ring sections is minimized by this arrangement and by virtue of the width of the substantially cylindrical anchor ring part 60 which positions hook flange 62 adjacent to the end face of the bell 14, i.e. between shoulder 20 and the bell end, and also by virtue of the fact that the hooked connection of the parts permits the parts to seat naturally to each other at such connections. Note in FIG. 2 that the point of interconnection of the hook parts 80 of the bolts 36 with the flanges 62 of the anchor ring 60 may occur radially inwardly of the radial position in the clamp of the axes of the drawbolts 36. This eliminates the fulcrum action heretofore commonly experienced with conventional constructions of bell joint clamps wherein the drawbolts extend at an angle to the axis of the pipe by reason of an arrangement in which the ends of the bolts which engage the anchor ring are spaced a greater distance from the axis of the pipe than the opposite ends of said bolts which engage the follower rings. Such angular bolt positioning tends to tilt the anchor ring sections in such a manner as to reduce the effectiveness of the anchorage thereof against the shoulder 20 of the pipe bell.

Another important advantage resulting from the use of the hook type drawbolts 36 is that the bolts can engage the anchor ring at any selected or convenient circumferential location instead of at a predetermined position only. This results in versatility of the clamps and ability to use clamp parts in different combinations to accommodate different shapes of bell joints, and like conditions. It will also be observed that the use of the hook flanges 62 and 66 on the anchor ring 32 serves to reinforce the parts of the anchor ring at the points at which the respective bolts apply tension.

It is conventional practice to form the anchor rings and follower rings of bell joint clamps from malleable metal castings in order to minimize corrosion thereof, especially in underground installations. The use of the present construction with hook bolts makes possible the use of bolts made of malleable metal, that is, of the same material or substantially the same material, as the material of which the anchor rings and the follower rings are formed. The use of similar materials is advantageous in avoiding the occurrence of galvanic effects as sometimes occur due to differences in the properties of different metals as exposed to wet soil and different ground conditions. Another advantage of the use of hooks is the fact that the overall length of drawbolts may be reduced due to the longitudinal positioning of the bolts in use as distinguished from positioning at an angle to the axis of a pipe as heretofore has been common. Another advantage is that the same bolt may be used for a drawbolt and for an anchor bolt section connector, and further that the same bolt may be used on a wide range of sizes of clamps to fit different pipe sizes.

It is common practice to coat clamp parts for protection against corrosion. The present construction, particularly as to the anchor ring, simplifies the application of such coatings and reduces the cost thereof by reason of the shape and the small size of the ring sections.

While the preferred embodiment of the invention has been illustrated and described, it will be understood that changes in the construction may be made within the scope of the appended claims without departing from the spirit of the invention.

I claim:

1. A bell joint pipe clamp for use in sealing leaks at bell and spigot pipe joints wherein a bell pipe section has an end face and a substantially cylindrical end part defined by a circumferential shoulder extending radially inwardly from said cylindrical end part, comprising a gasket encircling said spigot and abutting said bell end face, a rigid follower ring for encircling said pipe and having a frusto conical gasket compressing surface and circumferentially spaced radially projecting parts each having an axial aperture, an anchor ring formed of a plurality of parts which present a substantially cylindrical shape when assembled, each anchor ring part having a cross sectional shape defining a substantially flat part, a radially inwardly extending anchoring abutment and a radially outward projecting hook portion, said flat anchor ring part encircling said cylindrical bell end part for a substantial portion of its axial extent and disposed in engagement therewith with said anchoring abutment engaging said bell shoulder and said hook portion adjacent to said bell end face and between said shoulder and bell end face, and draw bolts each having a hook end part and rockable in an axial aperture of said follower ring to permit said hook end part thereof to be swung around and engaged behind said anchor ring hook portion, said draw bolts and the flat part of said anchor ring being substantially parallel to the axis of said pipe and to said bell end portion when said bolt and anchor ring hooks are engaged whereby to apply axial gasket comprising force between said anchor ring abutment and said follower ring.

2. A bell joint clamp as defined in claim 1, wherein the radially outwardly projecting hook portion of each anchor ring part extends for the major part of the circumferential dimension thereof.

3. A bell joint clamp as defined in claim 1, wherein said inwardly extending abutment of each anchor ring part engages said shoulder at circumferentially spaced points and said anchor ring parts are connected end to end by means which accommodate relative rocking of said anchor ring parts to permit the firm seating of the abutment of each ring part with said shoulder.

References Cited in the file of this patent

UNITED STATES PATENTS

| 529,806 | Rann | Nov. 27, 1894 |
| 1,951,034 | Norton | Mar. 13, 1934 |
| 2,108,151 | Teetor | Feb. 15, 1938 |
| 2,115,670 | Merrill | Apr. 26, 1938 |
| 2,138,135 | Baucher | Nov. 29, 1938 |
| 2,842,383 | Merrill | July 8, 1958 |
| 2,860,008 | Jacoby | Nov. 11, 1958 |
| 2,897,568 | Hoke | Aug. 4, 1959 |

FOREIGN PATENTS

| 182,023 | Germany | May 25, 1955 |